Feb. 16, 1943.    C. HAPANOWICZ    2,311,592
FASTENING DEVICE
Filed March 21, 1941

INVENTOR·
Charles Hapanowicz
BY J. B. Felshin
his ATTORNEY.

Patented Feb. 16, 1943

2,311,592

UNITED STATES PATENT OFFICE 2,311,592

FASTENING DEVICE

Charles Hapanowicz, Newark, N. J., assignor of fifty per cent to Herbert J. Newmark, New York, N. Y.

Application March 21, 1941, Serial No. 384,472

4 Claims. (Cl. 85—36)

This invention relates to fastening devices. It is particularly directed to means for securing together plates, walls or sheets, such as cowls or wings of aeroplanes, and the like devices.

An object of this invention is to provide a fastening device of the character described, having means for adjusting the securing pressure, and to take up looseness or slack which may develop between the parts secured.

A further object of this invention is to provide a fastening device of the character described, which will have a lock bolt and nut effect, but eliminating necessity for screw threads.

Yet a further object of this invention is to provide a compact and durable device of the character described, which shall be relatively inexpensive to manufacture, simple in construction, light in weight, and shall be easy to manipulate, and which shall yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown various possible illustrative embodiments of this invention, Fig. 1 is a top plan view of a pair of superimposed plates secured together by a fastening device embodying the invention;

Figure 1:
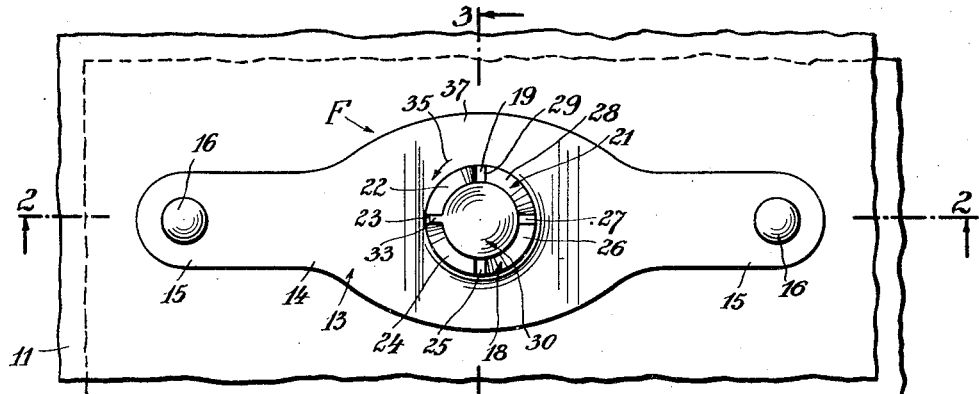
Figure 2:
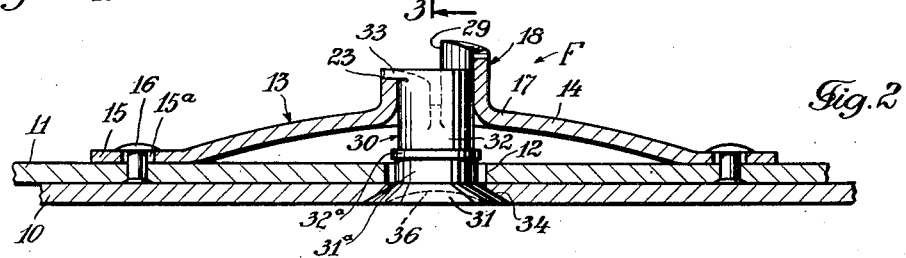
Fig. 2 is a cross-sectional view taken on line 2—2 of Fig. 1.
Figure 3:
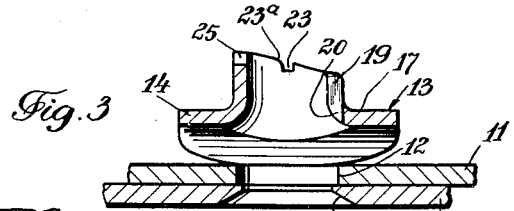
Fig. 3 is a cross-sectional view taken on line 3—3 of Fig. 1.
Figure 4:
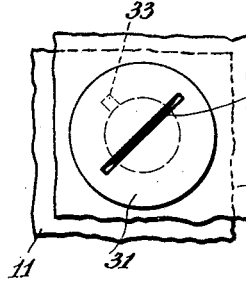
Fig. 4 is a bottom plan view of the structure shown in Fig. 1.
Figure 5:
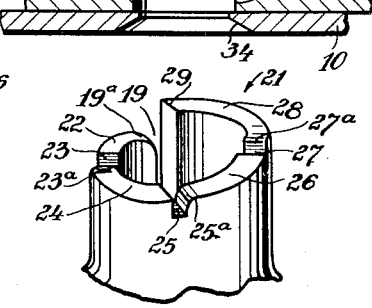
Fig. 5 is a fragmentary perspective view of the locking spring forming part of the fastening device embodying the invention.
Figure 6:
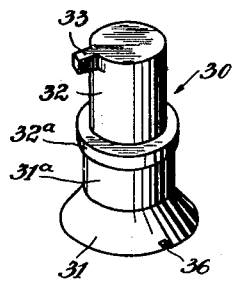
Fig. 6 is a perspective view of the bolt forming part of the fastening device embodying the invention.

Referring now in detail to the drawing, numerals 10 and 11 indicate two superimposed plates which are fastened together by fastening means F embodying the invention. The fastening means F comprises generally a spring device 13 and a bolt 30. The plates 10 and 11 are formed with holes 34 and 12, respectively, through which the bolt passes for engagement with the spring device 13, as will be more fully described hereinafter. Opening 12 is of a larger diameter than opening 34, for the purpose hereinafter explained.

The bolt 30 has at one end an enlarged head 31 formed with a kerf 36, so that the bolt may be turned by means of a screw driver. The head 31 is conical and is received in the countersunk undersurface of plate 10, at opening 34. Extending from head 31 is a shank portion 31a, passing through the openings 34 and 12, and of a diameter somewhat less than that of opening 34. Extending from said shank portion, is another shank portion 32 of reduced diameter. Between shank portions 31a, 32 is a collar 32a of a diameter equal to the diameter of opening 34, but less in diameter than opening 12. Collar 32a can be forced through opening 34, but once through said opening, will prevent bolt 30 from accidentally falling out of opening 34.

The spring device 13 is mounted on top of the plate 11. Said spring device comprises an upwardly arched portion 14, from the ends of which there extends, flat, co-planar terminal portions 15 contacting the upper surface of plate 11. Portions 15 of the spring 13 are formed with longitudinal slots 15a. Attached to the plate 11 are rivets 16 having shanks passing through the slots 15a and heads 16 at the upper ends thereof, contacting the upper surfaces of the end portions 15 of the spring.

It will now be understood that when the central or arched portion of the spring is pressed downwardly, the terminal portions 15 will spread, the slots 15a permitting the spreading apart of said terminal portions.

At the center of the arched portion 14 is an upwardly pressed integral sleeve 18, co-axial with the holes 12, 34, and adapted to receive the portion 32 of the bolt 30. Said sleeve 18 is formed with a longitudinal through a slot 19. In passing the bolt upwardly to engage the spring in a manner hereinafter appearing, the lug 33 passes through the slot 19, entering said slot through the lower end 20 thereof. The sleeve 18 has at its upper end a helical edge surface 21 beginning and ending at the slot 19. The helical surface 21 is divided into four gradually rising parts, designated by numerals 22, 24, 26 and 28. Between the parts 22 and 24 is a shallow notch 23. Between the parts 24 and 26 is a shallow notch 25, and between the parts 26 and 28, is a shallow notch 27. The highest point of the upper edge 21 of the sleeve is indicated by numeral 29 on the drawing.

To secure the plates together, the bolt 30 is